(12) United States Patent
Milne et al.

(10) Patent No.: US 8,442,904 B2
(45) Date of Patent: May 14, 2013

(54) DETERMINATION OF IMPLIED ORDERS IN A TRADE MATCHING SYSTEM

(75) Inventors: Andrew Ferguson Milne, Maplewood, NJ (US); Aleksandr Sedlin, Brooklyn, NY (US)

(73) Assignee: New York Mercantile Exchange, Inc., New York, NY (US)

( * ) Notice: Subject to any disclaimer, the term of this patent is extended or adjusted under 35 U.S.C. 154(b) by 0 days.

(21) Appl. No.: 13/532,352

(22) Filed: Jun. 25, 2012

(65) Prior Publication Data

US 2012/0265668 A1    Oct. 18, 2012

Related U.S. Application Data

(63) Continuation of application No. 12/350,788, filed on Jan. 8, 2009, now Pat. No. 8,229,835.

(51) Int. Cl.
*G06Q 40/00* (2012.01)
(52) U.S. Cl.
USPC ............... 705/37; 705/36 R; 705/35
(58) Field of Classification Search ........... 705/37, 705/35, 36 R
See application file for complete search history.

(56) References Cited

U.S. PATENT DOCUMENTS

| | | | |
|---|---|---|---|
| 4,677,552 A | 6/1987 | Sibley, Jr. | |
| 4,903,201 A | 2/1990 | Wagner | |
| 4,980,826 A | 12/1990 | Wagner | |
| 5,774,880 A * | 6/1998 | Ginsberg | 705/36 R |
| 5,787,402 A | 7/1998 | Potter et al. | |
| 6,021,397 A | 2/2000 | Jones et al. | |
| 6,047,274 A | 4/2000 | Johnson et al. | |
| 6,317,727 B1 | 11/2001 | May | |
| 6,321,212 B1 | 11/2001 | Lange | |
| 6,347,307 B1 | 2/2002 | Sandhu et al. | |
| 6,405,180 B2 | 6/2002 | Tifors et al. | |
| 6,418,419 B1 | 7/2002 | Nieboer et al. | |
| 6,421,653 B1 | 7/2002 | May | |

(Continued)

FOREIGN PATENT DOCUMENTS

| | | |
|---|---|---|
| EP | 0407026 | 1/1991 |
| EP | 0411748 | 2/1991 |
| JP | 2000353196 A | 12/2000 |
| JP | 2001222591 A | 8/2001 |

OTHER PUBLICATIONS

Peake, The National Book System, An Electronically Assisted Auction Market, pp. 02290-02353 (Apr. 30, 1976).

(Continued)

*Primary Examiner* — James Vezeris
(74) *Attorney, Agent, or Firm* — Banner & Witcoff, Ltd.

(57) ABSTRACT

A computer implemented method for determining implied orders in an electronic trading system is provided. The method comprises receiving a first set of one or more real orders, wherein the orders are not tradable against each other. One or more implied orders are identified within the first set of real orders. Market data corresponding to the implied orders can also be identified. At least one additional order is received and the tradability of the additional order is determined against the real or implied orders within the first set of real orders. A resting set of orders is determined from those real and implied orders within the first set of orders not affected by the tradability of the additional order. Implied orders are determined from within the set of resting orders.

20 Claims, 25 Drawing Sheets

U.S. PATENT DOCUMENTS

| | | |
|---|---|---|
| 6,618,707 B1 | 9/2003 | Gary |
| 6,658,393 B1 | 12/2003 | Basch et al. |
| 6,721,715 B2 | 4/2004 | Nemzow |
| 6,829,589 B1 | 12/2004 | Saliba |
| 6,996,540 B1 | 2/2006 | May |
| 7,039,610 B2 | 5/2006 | Morano et al. |
| 7,043,457 B1 | 5/2006 | Hansen |
| 7,089,206 B2 | 8/2006 | Martin |
| 7,130,789 B2 | 10/2006 | Glodjo et al. |
| 7,177,833 B1 | 2/2007 | Marynowski et al. |
| 7,194,481 B1 | 3/2007 | Van Roon |
| 7,231,363 B1 | 6/2007 | Hughes et al. |
| 7,246,092 B1 | 7/2007 | Peterson et al. |
| 7,299,208 B1 | 11/2007 | Bailon et al. |
| 7,548,882 B1 * | 6/2009 | Pazner ................... 705/37 |
| 7,933,827 B2 | 4/2011 | Richmann et al. |
| 2001/0042785 A1 | 11/2001 | Walker et al. |
| 2001/0056398 A1 | 12/2001 | Scheirer |
| 2002/0002530 A1 | 1/2002 | May |
| 2002/0035531 A1 | 3/2002 | Push |
| 2002/0070915 A1 | 6/2002 | Mazza et al. |
| 2002/0077947 A1 | 6/2002 | Ward et al. |
| 2002/0099651 A1 | 7/2002 | May |
| 2002/0116314 A1 | 8/2002 | Spencer et al. |
| 2002/0116317 A1 | 8/2002 | May |
| 2002/0156719 A1 | 10/2002 | Finebaum et al. |
| 2002/0169774 A1 | 11/2002 | Greenbaum et al. |
| 2002/0178102 A1 | 11/2002 | Scheinberg et al. |
| 2002/0194115 A1 | 12/2002 | Nordicht et al. |
| 2003/0009419 A1 | 1/2003 | Chavez et al. |
| 2003/0023542 A1 | 1/2003 | Kemp, II et al. |
| 2003/0033240 A1 | 2/2003 | Balson et al. |
| 2003/0050879 A1 | 3/2003 | Rosen et al. |
| 2003/0069830 A1 | 4/2003 | Morano et al. |
| 2003/0093360 A1 | 5/2003 | May |
| 2003/0125982 A1 | 7/2003 | Ginsberg et al. |
| 2003/0200167 A1 | 10/2003 | Kemp, II et al. |
| 2003/0220868 A1 | 11/2003 | May |
| 2003/0229571 A1 | 12/2003 | May |
| 2003/0236737 A1 | 12/2003 | Kemp, II et al. |
| 2003/0236738 A1 | 12/2003 | Lange et al. |
| 2004/0015430 A1 | 1/2004 | May |
| 2004/0015431 A1 | 1/2004 | May |
| 2004/0039682 A1 | 2/2004 | Sandholm et al. |
| 2004/0049738 A1 | 3/2004 | Thompson et al. |
| 2004/0064395 A1 | 4/2004 | Mintz et al. |
| 2004/0088242 A1 | 5/2004 | Ascher et al. |
| 2004/0093300 A1 | 5/2004 | Burns |
| 2004/0103054 A1 | 5/2004 | Singer |
| 2004/0117302 A1 | 6/2004 | Weichert et al. |
| 2004/0148242 A1 | 7/2004 | Liu |
| 2004/0153391 A1 | 8/2004 | Burns et al. |
| 2004/0153392 A1 | 8/2004 | West et al. |
| 2004/0153393 A1 | 8/2004 | West et al. |
| 2004/0153394 A1 | 8/2004 | West et al. |
| 2004/0172337 A1 | 9/2004 | Spoonhower et al. |
| 2004/0186806 A1 | 9/2004 | Sinclair et al. |
| 2004/0210514 A1 | 10/2004 | Kemp, II et al. |
| 2004/0236662 A1 | 11/2004 | Korhammer et al. |
| 2004/0254804 A1 | 12/2004 | Peterffy et al. |
| 2005/0044027 A1 | 2/2005 | Rodgers et al. |
| 2005/0080703 A1 | 4/2005 | Chiesa et al. |
| 2005/0086152 A1 | 4/2005 | Sweeting |
| 2005/0097026 A1 | 5/2005 | Morano et al. |
| 2005/0097027 A1 | 5/2005 | Kavanaugh |
| 2005/0137964 A1 | 6/2005 | Nordlight et al. |
| 2005/0171890 A1 | 8/2005 | Daley et al. |
| 2005/0171894 A1 | 8/2005 | Traynor |
| 2005/0187866 A1 | 8/2005 | Lee |
| 2005/0246263 A1 | 11/2005 | Ogg et al. |
| 2005/0283422 A1 | 12/2005 | Myr |
| 2006/0015436 A1 | 1/2006 | Burns et al. |
| 2006/0059064 A1 | 3/2006 | Glinberg et al. |
| 2006/0059065 A1 | 3/2006 | Glinberg et al. |
| 2006/0059066 A1 | 3/2006 | Glinberg et al. |
| 2006/0059067 A1 | 3/2006 | Glinberg et al. |
| 2006/0059068 A1 | 3/2006 | Glinberg et al. |
| 2006/0059069 A1 | 3/2006 | Glinberg et al. |
| 2006/0095363 A1 | 5/2006 | May |
| 2006/0149660 A1 | 7/2006 | Morano et al. |
| 2006/0161498 A1 | 7/2006 | Morano et al. |
| 2006/0173761 A1 | 8/2006 | Costakis |
| 2006/0190371 A1 | 8/2006 | Almgren et al. |
| 2006/0190383 A1 | 8/2006 | May |
| 2006/0259406 A1 | 11/2006 | Burns et al. |
| 2006/0259409 A1 | 11/2006 | Burns et al. |
| 2006/0265296 A1 | 11/2006 | Glinberg et al. |
| 2007/0011079 A1 | 1/2007 | May |
| 2007/0100732 A1 | 5/2007 | Ibbotson et al. |
| 2007/0112665 A1 | 5/2007 | Mackey, Jr. et al. |
| 2007/0239591 A1 | 10/2007 | May |
| 2007/0282733 A1 | 12/2007 | May |
| 2008/0077320 A1 | 3/2008 | Loftus et al. |
| 2008/0133402 A1 | 6/2008 | Kurian et al. |
| 2008/0154764 A1 | 6/2008 | Levine et al. |
| 2008/0183639 A1 | 7/2008 | DiSalvo |
| 2008/0208778 A1 | 8/2008 | Sayyar-Rodsari et al. |
| 2008/0288386 A1 | 11/2008 | Ferris |
| 2008/0288391 A1 | 11/2008 | Downs et al. |
| 2009/0063365 A1 | 3/2009 | Pinkas |
| 2009/0076982 A1 | 3/2009 | Ginberg et al. |
| 2009/0083175 A1 | 3/2009 | Cushing |
| 2009/0106133 A1 | 4/2009 | Redmayne |
| 2009/0157563 A1 | 6/2009 | Serbin et al. |

OTHER PUBLICATIONS

Intex, The International Futures Exchange (Bermuda) Limited, Functional Specifications, pp. 01932-01999 (Aug. 1981).

PCT/US06/44932; International Search Report; Aug. 19, 2008.

PCT/US06/43282; International Search Report; May 30, 2008.

PCT/US06/44702; International Search Report; Aug. 18, 2007.

PCT/US06/28001; International Search Report; May 7, 2007.

PCT/US06/27762; International Search Report; Mar. 9, 2007.

CME® "Clearing Services CME and LCH"; Advisory Notice; http://www/web.archive.org/web/20050306002321/http:/lwww.cme.com/clearing/rmspan/cmllch . . . , last accessed Feb. 22, 2007; 1 page.

CME® "Clearing Services Layout for Results"; Advisory Notice; http://www/web.archive.org/web/2005030818020/http//www.cme.com/clearing/rmspan/cm/rec . . . , last accessed Feb. 22, 2007, 2 pages.

CME® "Foreign Exchange Products; Trading CME FX Futures: Maximizing the Opportunity for the Individual Investor"; 12005; 6 pages, 2005.

CME® "Glossary for Retail FX"; http://www.cme.com/files/FXWebglossary.pdf; 16 pages, 2009.

Position Limit, http://www.investopedia.com/terms/p/positionlimiUasp; 1 page, 2009.

U.S. Commodity Futures Trading Commission; "Security Futures Products Speculative Position Limits"; Limits; http://www.cftc.gov/industryoversight/contractsanddproducts/sfpeeculativelimits.html; Jul. 26, 2007; 1 page.

U.S. Commodity Futures Trading Commission; "What's New at the CFTC"; http://www.cftc.govlindex.htm; Mar. 19, 2009; 2 pages.

U.S. Commodity Futures Trading Commission; "Trading Organizations"; http://www.cfttc.gov/industryoversignUtradingorganizations.index.htm; Mar. 19, 2009; 1 page.

U.S. Commodity Futures Trading Commission; "Clearing Organizations"; http://www.cftc.govlindustryoversighUciearingorganizationslindex.htm; Mar. 19, 2009; 2 pages.

Hall "Getting Started in Stocks"; Third Edition; Google Book Search; http://books.google.com/books?id=mA-sSKmB2sC&dg=margin+account+maintenance . . . ; Sep. 26, 2008; pp. 105-114; Coughlan Publishing; 1997.

K. Balasubramanian et al, "Developing Applications Using Model-Driven Design Environments", IEEE Computer, Feb. 2006 (vol. 39, No. 2).

K. Chen et al, "Towards Formalizing Domain-specific Modeling Languages", Vanderbilt University Institute for Software Integrated Systems, presented at the Object Management Group (OMG) OMG's First Annual Model-Integrated Computing Workshop, 2004.

G. Guizzardi et al, "On the role of Domain Ontologies in the design of Domain-Specific Visual Modeling Languages", Proceedings of the 17th ACM Conference on Object-Oriented Programming, Systems, Languages and Applications (OPPSLA 2002), Seattle, USA, 2002, Helsinki School of Economics Printing, Working Paper Series W-334 (ISSN 1235-5674), downloaded from Centre for Telematics and Information Technology, University of Twente, The Netherlands.

G. Guizzardi et al, "Ontology-Based Evaluation and Design of Domain-Specific Visual Modeling Languages", Proceedings of the 14th International Conference on Information Systems Development, Karlstad, Sweden, 2005.

G. Karsai et al, "Model-Integrated Development of Embedded Software", Proceedings of the IEEE, Jan. 2003, vol. 91, No. 1.

D. Schmidt, "Model-Driven Engineering", IEEE Computer Feb. 2006; vol. 39, No. 2.

PCT/US2010/046591 International Search Report dated Oct. 13, 2010.

PCT/US2010/047075 International Search Report dated Oct. 14, 2010.

PCT/US2010/047489 International Search Report dated Oct. 25, 2010.

PCT/US2010/047086 International Search Report dated Oct. 13, 2010.

* cited by examiner

|      | VIRT | F | G | H |
|------|------|---|---|---|
| HO   |      | 1 | 2 | 3 |
|      | 0    |   |   |   |
| CL   |      | 4 | 5 | 6 |

FIG. 3

| Contract Symbol | Description | Buy Order Node Pair | Sell Order Node Pair |
|---|---|---|---|
| HOF | Heating Oil, January Delivery, Outright | 1,0 | 0,1 |
| HOG | Heating Oil, February Delivery, Outright | 2,0 | 0,2 |
| HOH | Heating Oil, March Delivery, Outright | 3,0 | 0,3 |
| CLF | Crude Oil, January Delivery, Outright | 4,0 | 0,4 |
| CLG | Crude Oil, February Delivery, Outright | 5,0 | 0,5 |
| CLH | Crude Oil, March Delivery, Outright | 6,0 | 0,6 |
| HOF:HOG | Buy Jan Heat, Sell Feb Heat, Calendar Spread | 1,2 | 2,1 |
| HOF:HOH | Buy Jan Heat, Sell Mar Heat, Calendar Spread | 1,3 | 3,1 |
| HOG:HOH | Buy Feb Heat, Sell Mar Heat, Calendar Spread | 2,3 | 3,2 |
| CLF:CLG | Buy Jan Crude, Sell Feb Crude, Calendar Spread | 4,5 | 5,4 |
| CLF:CLH | Buy Jan Heat, Sell Mar Crude, Calendar Spread | 4,6 | 6,4 |
| CLG:CLH | Buy Feb Heat, Sell Mar Heat, Calendar Spread | 5,6 | 6,5 |
| HOF:CLF | Buy Jan Heat, Sell Jan Crude, Inter-commodity Spread | 1,4 | 4,1 |
| HOG:CLG | Buy Feb Heat, Sell Feb Crude, Inter-commodity Spread | 2,5 | 5,2 |
| HOH:CLH | Buy Mar Heat, Sell Mar Crude, Inter-commodity Spread | 3,6 | 6,3 |

FIG. 5

| spt[i,j] | j=0 | j=1 | j=2 | j=3 | j=4 | j=5 | j=6 |
|---|---|---|---|---|---|---|---|
| i=0 | 0 | 0 | 0 | 2 | 1 | 5 | 6 |
| i=1 | 1 | 1 | 0 | 2 | 1 | 5 | 6 |
| i=2 | 1 | 2 | 2 | 2 | 1 | 5 | 6 |
| i=3 | 3 | 0 | 0 | 3 | 1 | 5 | 6 |
| i=4 | 1 | 4 | 0 | 2 | 4 | 5 | 6 |
| i=5 | 1 | 4 | 5 | 2 | 5 | 5 | 5 |
| i=6 | 6 | 4 | 5 | 6 | 5 | 6 | 6 |

FIG. 20

| Implicator Event | Description |
|---|---|
| BB | Better Best Level. Caused by a new order that establishes a new best level. |
| WB | Worse Best Level. Caused by pulling an order from a best level where it was the only order, or by a trade that eliminates the best level. |
| GVB | Greater Volume in Best Level. Caused by adding an order to the best level or modifying an order that was already there. |
| LVB | Less Volume in Best Level. Caused by pulling or modifying an order from the best level, or by a trade that does not eliminate the best level. |
| DEFAULT | Any event that changes a best level that does not fall into a category for which there is an analysis of possible change to the shortest path trees. It results in the recalculation of all the trees. |

FIG. 21

MULTI-THREADED IMPLICATION WITH FIXED RATE "MOVIE MODE" FILTERING OF MARKET DATA. AVERAGE MESSAGE RATE 3225 MPS.

DETERMINATION OF IMPLIED ORDERS IN A TRADE MATCHING SYSTEM

RELATED APPLICATIONS

This application is a continuation of U.S. patent application Ser. No. 12/350,788 filed Jan. 8, 2009. This application is related to U.S. patent application Ser. No. 10/700,406, filed Nov. 4, 2003. This application is related to U.S. patent application Ser. No. 11/368,966, filed Mar. 6, 2006, which is a divisional of U.S. patent application Ser. No. 09/971,172, filed on Oct. 4, 2001. This application is related to U.S. patent application Ser. No. 12/032,379, filed Feb. 15, 2008. All of the above applications are incorporated herein by reference in their entireties.

TECHNICAL FIELD

The present invention relates to software, systems and methods for electronic trading in a commodities exchange, derivatives exchange or similar business involving tradable items where orders from buyers are matched with orders from sellers.

BACKGROUND

Electronic trading systems allow entry of a bid or offer for a particular tradable item. These simple bids and offers are called outright orders, in contrast with spread orders, discussed in more detail below.

A spread order is the simultaneous purchase and sale of two tradable items, such as futures contracts for different months, different commodities, or different grades of the same commodity. Each bid and offer component of a spread is termed a bid leg and an offer leg respectively. Real orders are orders that are entered into the system by traders. The traders enter the appropriate information into the trading system and release the order into the system as an open order. Real orders may be entered for any tradable item in the system including, but not limited to, futures, options, inter-commodity spreads, intra-commodity spreads, futures strips, etc.

Implied orders, unlike real orders, are generated by the system on the behalf of traders who have entered real orders. For example, an implied spread may be derived from two real outrights. The system creates the "derived" or "implied" order and displays the market that results from the creation of the implied order as a market that may be traded against. If a trader trades against this implied market, then the real orders that combined to create the implied order and the resulting market are executed as matched trades.

Trading systems that derive implied orders are often limited by computing capacity and speed. Prior-art trading systems do not have an efficient method of determining all possible or best possible implied markets, especially when the order combinations involve more than a few orders.

Contemporary trading systems are typically implemented with distributed architectures. These systems include functional components with a high degree of logical separation so that each component is largely insulated from the actions of other components. Distributed systems leverage the improved abilities to communicate between system components so that complex functions can be implemented as many small components. These smaller components are easier to design and maintain, and provide much greater flexibility in adapting to a variety of computer hardware/operating system environments.

The order matching function in a trading system is typically performed by a specialized component referred to as the Match Engine, of which there may be multiple instances. Each Match Engine is a specialized order matching component that receives orders, stores them internally, calculates tradable combinations and advertises the availability of real and implied orders in the form of market data. When the traders using the system respond to the market data by sending additional orders, these are received by the Match Engine, which then attempts to match them with previously received orders or combinations thereof. The Match Engine executes the possible trades and communicates the results.

Implied orders frequently have better prices than the corresponding real orders in the same contract. This can occur when two or more traders incrementally improve their order prices in hope of attracting a trade. Combining the small improvements from two or more real orders can result in a big improvement in the implied order. In general, advertising implied orders at better prices will encourage traders to enter the opposing orders to trade with them. The more combinations that the Match Engine can calculate, the greater this encouragement will be, and the more the exchange will benefit from increased transaction volume. However, as the number of advertised orders increases, so does the time required to calculate and publish them as market data. This creates a problem for the exchange, since traders expect a quick response from the trading system and are ready to take their business elsewhere if they do not get it.

In prior-art systems, the inability to calculate and publish implied orders in a timely manner has limited their use. In these systems only a few simple combinations are calculated and then only for a small number of heavily traded contracts. In contrast, implementation of the present invention allows for the efficient calculation of large combinations for large numbers of related contracts. It accomplishes this by dividing the contracts inside the Match Engine into groups that can be calculated in parallel and by filtering the market data so that implied orders with a greater probability of trading are reported more promptly and more frequently.

The discussion of the background to the invention herein is included to explain the context of the invention. This is not to be taken as an admission that any of the material referred to was published, known, or part of the common general knowledge as at the priority date of any of the claims.

Throughout the description and claims of the specification the word "comprise" and variations thereof, such as "comprising" and "comprises", is not intended to exclude other additives, components, integers or steps.

SUMMARY

The present invention generally relates to systems and methods for identifying and calculating implied orders in an electronic trade matching system. A method is provided whereby implied orders can be calculated from a set of real orders. In an implementation, the calculations may be performed in parallel to achieve greater speed and the search for implied orders may be limited to those with the greatest potential to earn revenue for the operator of the trading system. A method is also provided to reduce the amount of computation required for each new order or set of orders received by the trading system.

In an implementation, a computer implemented method for determining implied orders in an electronic trading system is provided. The method comprises receiving a first set of one or more real orders, wherein the orders are not tradable against each other. One or more implied orders are identified within the first set of real orders. Market data corresponding to the implied orders can also be identified. At least one additional order is received and the tradability of the additional order is determined against the real or implied orders within the first set of real orders. A resting set of orders is determined from those real and implied orders within the first set of orders not affected by the tradability of the additional order. Implied orders are determined from within the set of resting orders.

In an implementation a first set of real orders and the additional order can be translated according to a syntactic mapping of a modeling language. The translation can include mapping a unique trading system identifier for a tradable order onto a pair of nodes associated with elements on a contract grid, and mapping of prices with trading system units and decimal precisions onto common unit or unit-free integer prices with either the buy or the sell prices multiplied by negative one so that tradability is represented by a zero or negative sum of order prices.

In an implementation identification of one or more orders implied by the first set of real orders includes calculation of one or more shortest path trees, said shortest path trees including one or more nodes. The at least one additional real order can be categorized according to its effect on a directed edge. The shortest path trees can be analyzed to determine which trees or nodes within a tree are affected by the at least one additional order. A new value for each affected tree can be calculated, wherein the calculation for each affected tree is allocated to an independent thread of execution. The new value calculations can be merged with identified implied orders and associated market data. The identified implied orders and market data can be reported in a message suitable for translation to external form.

Various implementation can include one or more of the following features. Categorizing the additional market order comprises the categories of: better best price, worse best price, greater volume in best level, and less volume in best level. Analyzing the shortest path trees identifies potentially changed trees as members of a root set. Analyzing the shortest path trees identifies the potentially changed nodes within each tree as the members of a global change set or root-specific change set. Allocation to an independent thread further comprises calculation of one or more parameters that an independent thread can use to compute a root specific change set. Filter criteria can be set that limit implied orders or related market data associated with affected trees. The filter criteria are related the probability that an implied order in a specific tradable contract will result in an executed trade. The probability is based on relationship between the size of a bid/ask spread and the volume traded at that spread. The probability is based on a time difference between the identification of an implied order and an order that trades with the implied order. The filter criteria are adjusted automatically to expand or contract the amount of published market data in response to changes in trading conditions. The changes in trading conditions comprises the rate at which the first or second set of market orders are received. Calculating the shortest path trees includes recording of alternative paths in an implied edge collection when an indirect path is at the same price as a direct path but worse in a non-price property. The non-price property comprises time, volume, time and volume, or detection order.

The details of one or more implementations are set forth in the accompanying drawings and the description below. Other features, objects, and advantages will be apparent from the description and drawings, and from the claims.

BRIEF DESCRIPTION OF THE DRAWINGS

FIG. 3 shows the contract grid for a simple implication group;

FIG. 5. shows some common order symbols. These can be placed on the contract grid to represent the state of the Match Engine or used in a sequence of expressions to model an input message stream.

FIG. 20 shows the numerical representation of all 7 shortest path trees in the form of an SPT matrix, represented as spt[i,j] as it would appear in a programming language;

FIG. 21 shows a list of Implicator events which can be used to categorize an input message to the Match Engine according to how it can affect an edge;

DETAILED DESCRIPTION

The present invention is illustrated and described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the invention is readily extended to other protocols and interfaces in a predictable fashion.

Figure 1:
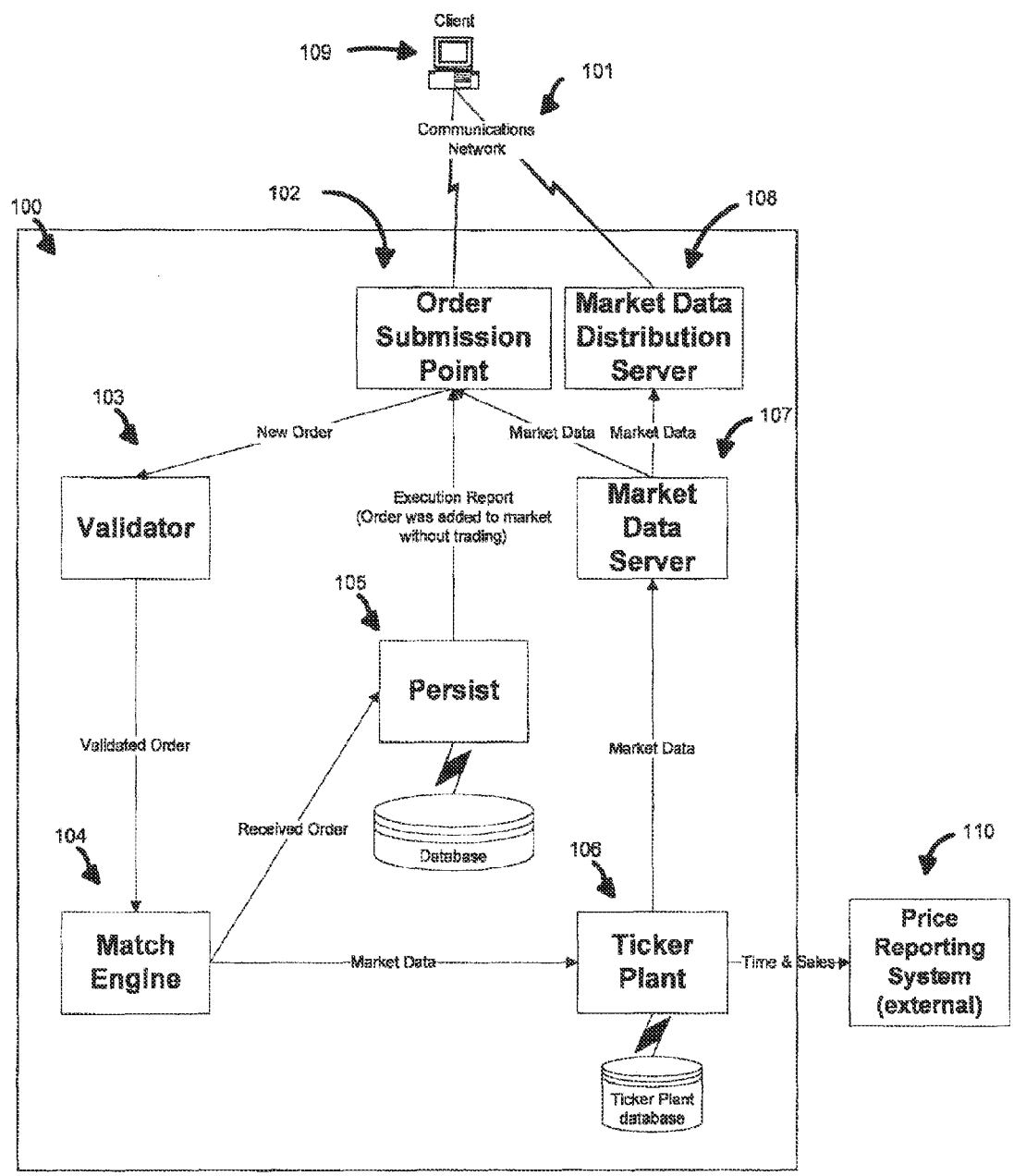
FIG. 1 shows a distributed trading architecture in which the present invention is implemented.

Regulated and unregulated exchanges and other electronic trading services make use of electronic trading systems. An example of the functional layout of such a system is shown in FIG. 1. In this example, the electronic trading system consists of the components inside the system boundary 100. The client 109 and the price reporting system 110 are outside the system but communicate with it using a communications network such as the Internet. The term client is used generically to indicate any user operated device or other networked device capable of communicating with the electronic trading system.

In an exemplary implementation, the client 109 transmits electronic orders to an Order Submission Point 102 by way of a communication network 101, such as the Internet. It is contemplated that Order Submission Points may take on a wide variety of application-specific designs to suit the needs of particular brokerages, investors, investment plans and the like. It is also contemplated that the electronic trading system may contain multiple Validators, Match Engines, Persist components, Ticker Plants, Market Data Servers and Market Data Distribution Servers. The routing of messages between these components is readily managed with commercially available hardware and software. It should be understood that descriptions are given in the singular only to simplify the exposition.

The Order Submission Point 102 communicates with the Validator 103. The Validator checks the properties of the new order against established criteria and communicates the validated order to the relevant Match Engine 104. In FIG. 1, it is assumed that the new order did not match any previously entered orders, so the Match Engine communicates a received order to the Persist component 105, which stores the order in its database. In FIG. 1, it is also assumed that the storage of the order by Persist constitutes its "official" reception by the trading system, so Persist communicates an execution report to the Order Submission Point 102, from which it is communicated to the originator of the order.

The Match Engine communicates the existence of the new order and any implied orders that it created to the Ticker Plant 106, which in turn communicates with the Market Data Server 107. The Ticker Plant occupies this position between the Match Engine and the Market Data Server because its function is to aggregate data from several sources and communicate with components outside the electronic trading system, such as the Price Reporting System 110. The Market Data server may communicate market data to the client 109 in a variety of ways. For example, the data may be sent to the Order Submission Point 102 for communication with the client over the same link as the execution report, or sent to a Market Data Distribution Server 108 that can communicate with any number of clients.

Those of skill in the art will appreciate that the operations of a Match Engine 104 may be performed in more than one part of a trading network or in related systems. For example, the calculation of implied orders may be done by traders at their trading stations in search of arbitrage opportunities between trading networks or match engines. It is also possible to perform these calculations outside a trading network for the evaluation of possible trading strategies, for instruction, regulation or in the solution of other problems where trading is used as a model.

Figure 2:
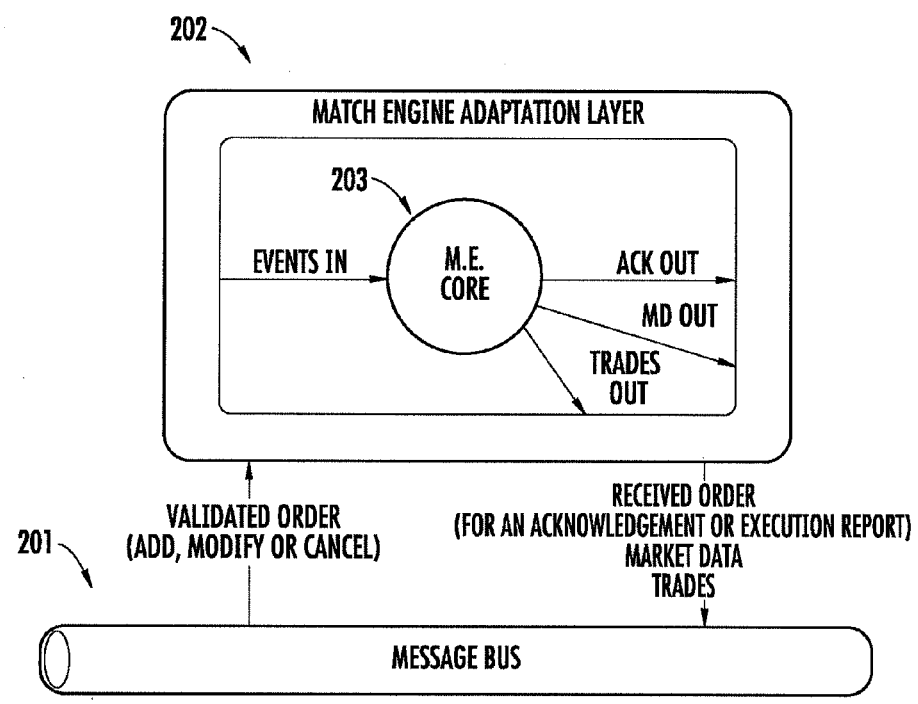
FIG. 2 shows a Match Engine with a layered architecture.

In some implementations, the Match Engine 104 will have a layered architecture as shown in FIG. 2. The Match Engine communicates with other components using a message bus 201. Incoming messages are translated by an Adaptation Layer 202 into events that can be processed by a Match Engine Core 203, sometimes referred to simply as the Core. The output messages from the Core are translated by the Adaptation Layer back into messages that can be transmitted to other parts of the trading system using the message bus 201. The Core 203 contains the program code required to calculate implied orders. This program code is referred to as the Implicator. The present invention is a new type of Implicator that uses graph theory, parallel processing and revenue shaping of the implied market data to increase its speed of calculation, publishing and trading overall. Although this example shows the Implicator as part of a Match Engine in an electronic trading system, the Implicator can be used in any system where implied orders need to be calculated. An example of such a system is the client software used by a trader to receive market data and search for arbitrage opportunities on multiple electronic trading systems.

Those of skill in the art will appreciate that a Match Engine Core and its Implicator may be implemented in a programming language such as Java or C++ that allows multiple threads of execution and that a program with multiple threads may be executed on a computing system with multiple central processing units (CPU). In such an implementation, if the program is correctly designed, the threads will execute in parallel and the time taken to execute all of the threads can be as short as the time taken by the single longest thread. If there are more threads than CPUs, then the execution time will depend on how many threads must be executed sequentially on each CPU. In FIG. 2, it is contemplated that the Core will be implemented in such a language and that the calculation of implied orders by the Implicator will be accelerated by performing many independent calculations in parallel on separate threads.

An Implicator operates on a group of contracts referred to as an implication group. In futures trading, an implication group consists of outright contracts and combination contracts that can trade with each other. An outright contract is defined by a product and a delivery period, such as West Texas Intermediate Crude Oil delivered at Cushing, Okla. in the month of January 2008. A combination contract is defined by two or more outright contracts which are referred to as legs. The simplest of these is the calendar spread, which is a contract to buy a product in one delivery period and sell it in another. The simplest possible implication group consists of two outrights and the spread between them.

It is possible to define combination contracts with any number of legs. Further examples of these include the intercommodity spread with two legs, the 3:2:1 ratio spread with three legs and the yearly strip with twelve legs. Any number of such contracts may be placed in an implication group so long as any combination contract that belongs to the group also has all of its outright leg contracts as members of the group. It is not necessary for every possible combination of the outright contracts to correspond to a tradable combination contract.

An example of a technique for defining implicable contracts and calculating the implied orders that can trade in such contracts can be found in U.S. patent application Ser. No. 12/032,379. The modeling language and implication techniques described therein make use of graph theory, which is the study of mathematical structures used to model pairwise relations between objects from a certain collection. A "graph" in this context refers to a collection of vertices or "nodes" and a collection of edges that connect pairs of vertices. The type of graph used in the technique is sometimes referred to more specifically as a "directed graph," since each edge is defined with a source node and a target node, and is directed from the source to the target.

Figure 3:
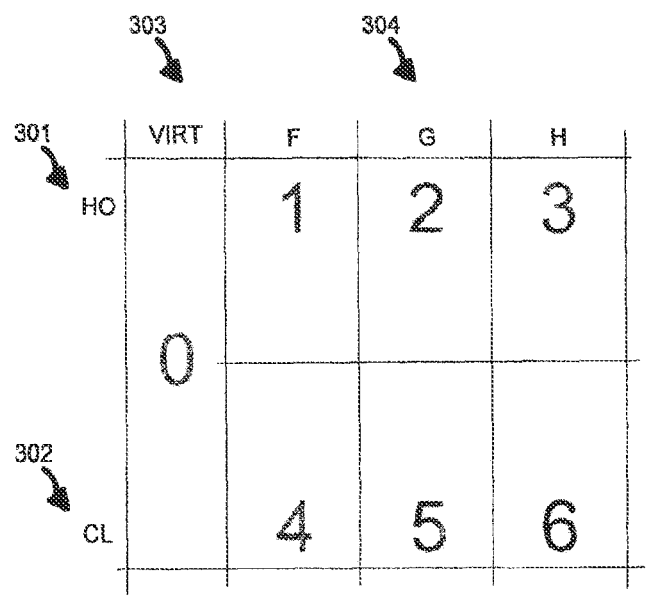
Figure 4:
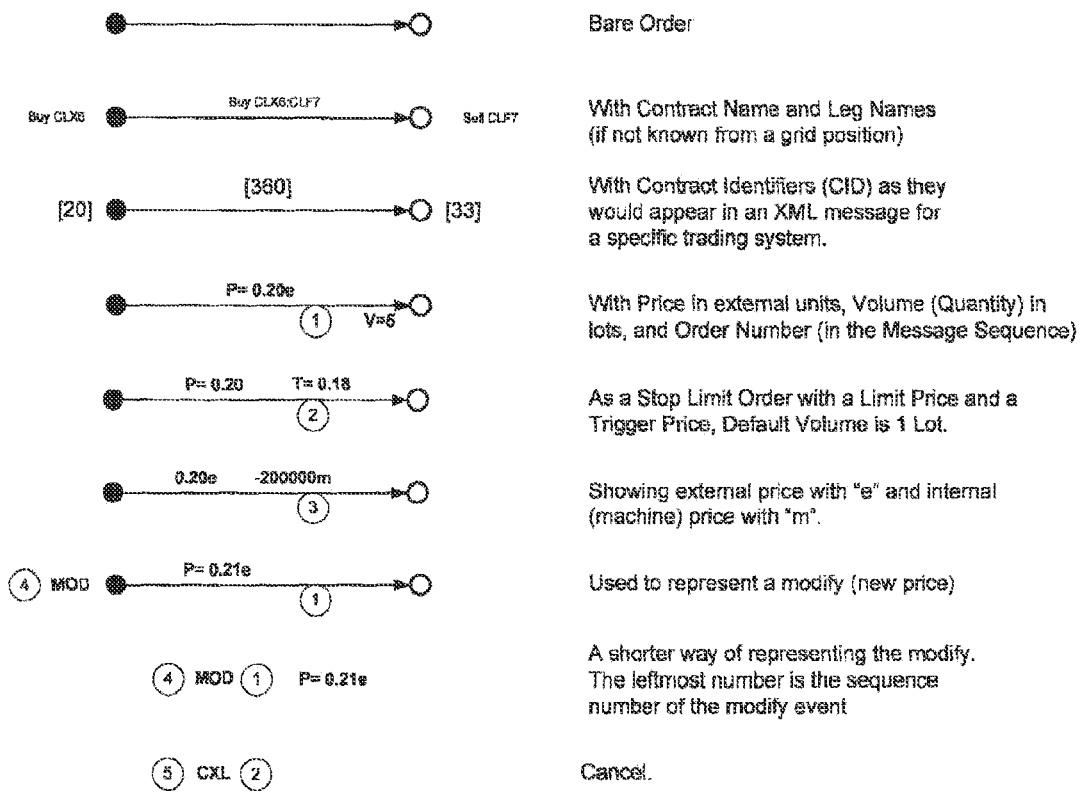
FIG. 4 shows exemplary decorated order elements.

A visual Match Engine Modeling Language (MEML) includes a concrete syntax, an abstract syntax for constructing expressions in the language, a syntactic mapping for associating expressions with elements of the trading system and a semantic mapping to relate modeling language expressions to real-world business requirements. The contract grid shown in FIG. 3 is an example of an expression. The decorated order elements shown in FIG. 4 are also expressions. The modeling language allows these expressions to be combined, so that decorated order elements can be placed on the contract grid to represent the presence of resting orders in the Match Engine Core.

In an implementation, the Adaptation Layer performs syntactic mapping of a set of orders, such as a set of resting orders. The Adaptation Layer associates contract identifiers in the external trading system with pairs of nodes in the graph defined by the contract grid in the Match Engine Modeling Language. It associates external trading system prices in real world units like barrels and gallons in a futures contract with machine prices in scaled units that are internal to the Match Engine Core and common to all the contracts in the implication group.

The Adaptation Layer also applies a price conversion factor based on whether the order is a buy or a sell. Orders submitted by market participants as real orders may be either buys (bids) or sells (asks). The prices of these orders may be positive or negative, but in general a trade is possible when the bid is equal to or better than the asking price. When an order is placed on the contract grid, buys and sells are distinguished by their starting and ending points. The external price of a buy order is multiplied by −1 and the external price of a sell order is multiplied by +1 (i.e. no change) to express them as machine prices. As a result, the sum of the machine prices of two or more orders that can trade together will be equal to or less than zero.

The simple contact grid in FIG. 3 can be used to illustrate the present invention. The implication group consists of two products: Heating Oil 301 designated by "HO" and West Texas Intermediate Crude Oil 302 designated by "CL". There are three delivery periods 304 designated by the generic months January ("F"), February ("G") and March ("H"). There is also a virtual node 303 as required by the graph theory representation of outright orders as spread orders between a virtual contract and a real contract. The nodes of the graph are numbered from 0 to 6 and the tradable contracts correspond to node pairs as summarized in FIG. 5. It is understood that an actual trading system will require much larger grids for its implication groups.

Figure 6:
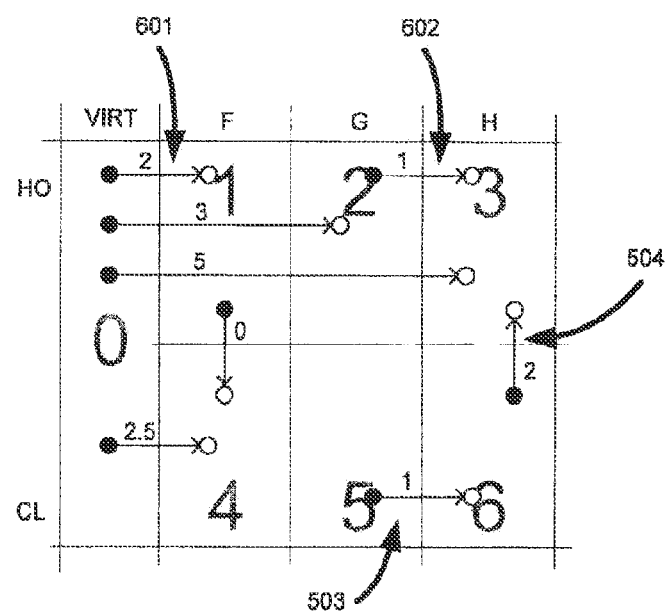
FIG. 6 shows the contract grid for a simple implication group with eight orders whose prices are given in simple dimensionless numbers.

FIG. 6 shows the placement of eight real orders on the contract grid. The real order prices are shown as machine prices. For convenience, the scaled prices are shown as simple integers in a common unit which is left unspecified. The real order volumes and time priorities are also left unspecified for the time being. The 0-1 edge 601 represents an outright order to sell January Heating Oil ("HOF") at a price of 2, and the 2-3 edge 602 represents a spread order to buy February Heating Oil and sell March Heating Oil at a price of 1. It is understood that Heating Oil prices are typically given in real world units of dollars per gallon and Crude Oil prices in units of dollars per barrel, and that the Adaptation Layer will scale the input values appropriately.

Real orders for arbitrary outright and combination contracts can be expressed with directed edges on a graph. Implied orders in a specific contract can be calculated as the shortest path between the corresponding nodes. Various methods can be used to calculate the shortest paths including, without limitation: Floyd's algorithm, the Bellman-Ford algorithm, Dijkstra's algorithm and Johnson's algorithm. The method used to calculate the shortest path between nodes depends on the structure of the implication group and the distribution of orders among various contracts, and can be implemented with the algorithms most suited to the orders likely to be encountered.

Implementations described herein include techniques for minimizing the amount of computation required. Implementations use various properties of electronic trading to parallelize and prioritize the computations.

FIG. 2 illustrates an exemplary implementation wherein, the communication between the Adaptation Layer 202 and Match Engine Core 203 is shown in terms of input events and output responses. Incoming events or orders are categorized into Implicator events depending on the changes they cause to a stored edge. Current implied markets are analyzed to determine which shortest paths will be changed by the changed edge and how much of each path needs to be recalculated. Independent subgroups of implied calculations are allocated to a number of independent threads of execution. Filter criteria are set to limit the reporting of implied orders to those of the greatest business value and to terminate the calculations as soon as these are found. Criteria are set for managing the execution of the independent threads on separate processors. And the results are merged into a single message appropriate for translation by the Adaptation Layer for publication as market data to other components of the trading system.

The parallelization and prioritization techniques are illustrated, for example, using the calculation of implied orders using Dijkstra's algorithm on reweighted edges. At the end of this step, the techniques of the present invention will be illustrated using the shortest path trees resulting from the Dijkstra calculation. Those of skill in the art will appreciate that the categorization, analysis, allocation, filtering, thread management and merging techniques of the present invention do not depend on the specific form of shortest path calculation so long as there is a means of assigning shortest path trees or similar subgroups of implied market data to independent threads. The Implicator can take advantage of further innovations in this area as well as prior-art techniques such as those taught by U.S. Pat. Nos. 6,356,911 and 7,280,481.

In an implementation, an edge corresponds to the best price level on a given side of a contract. The price of the edge is the price of the best level. The volume of the edge is the total volume of all the orders at the best price level. The time priority of the edge is the time priority of the first order to arrive, also referred to as the front-of-queue order.

The definition of shortest path is extended to include these properties of the edge. The price of a path is the sum of all the edge prices in the path. The path volume is the minimum volume of any of the path's component edges. The path time is the maximum time priority number of any of the path's component edges. This is the time priority of the order that "completes" the implied, i.e. the last component order to arrive in the Match Engine. The priority of a path is determined first by the price. If two paths have the same price, then the path with the earliest time priority is "shorter" (i.e. takes precedence) and is considered to be of higher priority. If two paths have the same price and time priority, then the path with the greatest volume takes precedence and is considered to be of higher priority. If all three properties are the same then, in the current implementation, the algorithm selects the first discovered path as being of higher priority. In another implementation, however, additional edge properties could be included in this algorithm for determination of the highest priority path.

Given that a real order is defined as an edge from one node to another, an implied order is simply a path from one node to another whose price, time priority and volume are calculated as from the prices, time priorities and volumes of the component edges. It is understood that an incoming real order that trades against this implied order will actually trade against several chains of orders that form the same path. Each edge will have a front-of-queue order and the volume of the any trade cannot exceed the volume of the smallest front-of-queue order. If the incoming real order is greater in volume than the smallest front-of-queue order but less than the aggregated volume of the path, then successive trades are executed until either the input order or the implied path is eliminated.

A virtual node can be included as part of the concrete syntax of the Match Engine Modeling Language. This allows real outright orders to be expressed as spreads between the virtual node and the node that corresponds to the product and delivery month that define the outright. In some implementations, a directional convention can be included whereby real outright sell orders correspond to the outgoing edges from this node. Taken together, these properties make the shortest path from the virtual node to a given outright node equivalent to the lowest market asking price for the given outright contract. In the description that follows, the general concept of reweighting relative to an arbitrary real or virtual node, which is known to those of skill in the art, has been applied to the specific virtual node as the origin of the sell outfights being represented as spreads. This gives the subsequent reweighted edge prices a specific business meaning that can be exploited to manage the computations.

Figure 7:
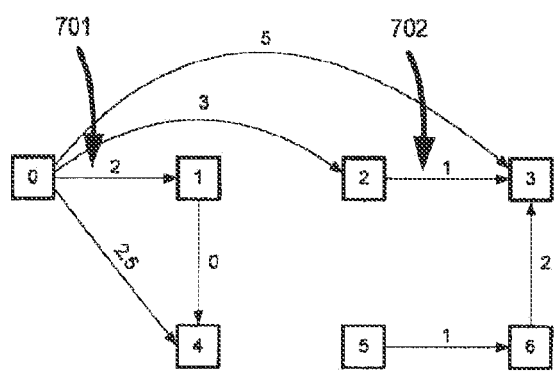
FIG. 7 shows an equivalent graph representation of the orders without the details of specific contracts.
Figure 8:
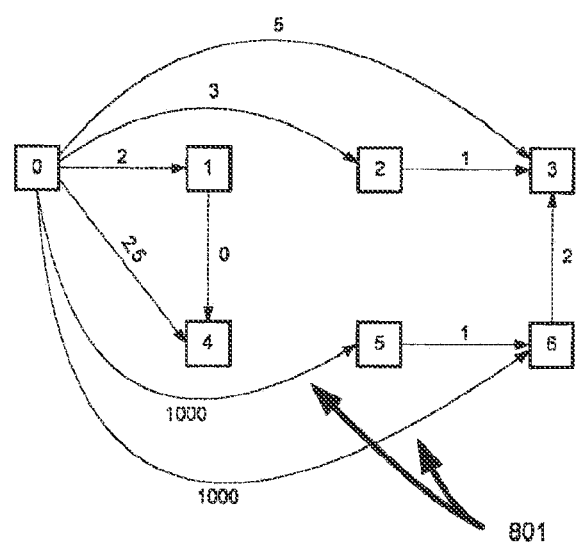
FIG. 8 shows the addition of sentinel-priced orders to compute the shortest path tree from node zero to all nodes in the contract grid.

The first step in calculating the implied orders is to compute the weights of the nodes in the order graph relative to the virtual node. FIG. 7 shows how the order graph of FIG. 6 can be represented more simply with numbered nodes and weighted edges. Order 601 in FIG. 6 is shown as edge 701 in FIG. 7 and order 602 in FIG. 6 is shown as 702 in FIG. 7. FIG. 8 shows the addition of sentinel-priced orders 801 to assign prices to unreachable nodes. The sentinel prices are defined as real prices that are much greater than any price that would be encountered in practice, such as $10,000,000.00 per barrel for oil. This technique allows absent edges to be identified with a simple price comparison, which is faster in execution and simpler to implement.

Figure 9:
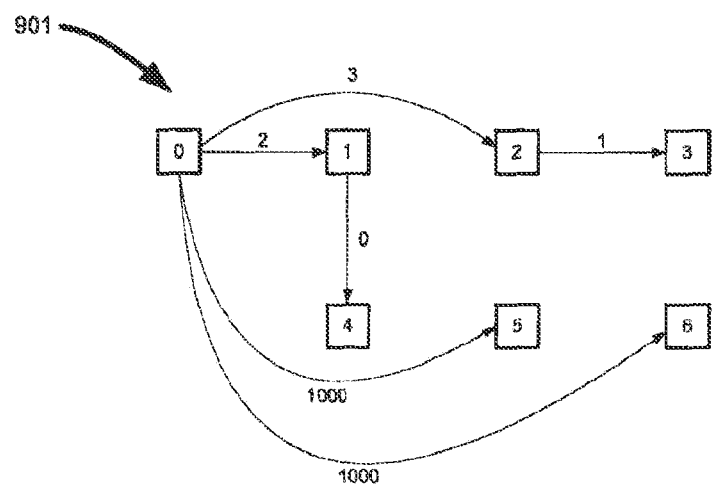
FIG. 9 shows the shortest path tree (SPT) as it might be computed by the Bellman-Ford algorithm, along with a numerical representation of the tree structure and the weights of the nodes.

FIG. 9 shows the shortest path tree 901 that would result from the application of the Bellman-Ford algorithm. The spt[j] one-dimensional array 902 contains the predecessor of each node in the tree (i.e. node j is preceded by node spt[j]) and the wt[j] one-dimensional array 903 contains the node weights (i.e. wt[j] is the sum of the edge prices between node 0 and node j along the shortest path). It is understood that the sentinel price of 1000 is intended purely for illustration and that in an implementation, the sentinel price would be much greater than any actual price but still within the range of numbers that can be handled by the computing system without causing an overflow.

Figure 10:
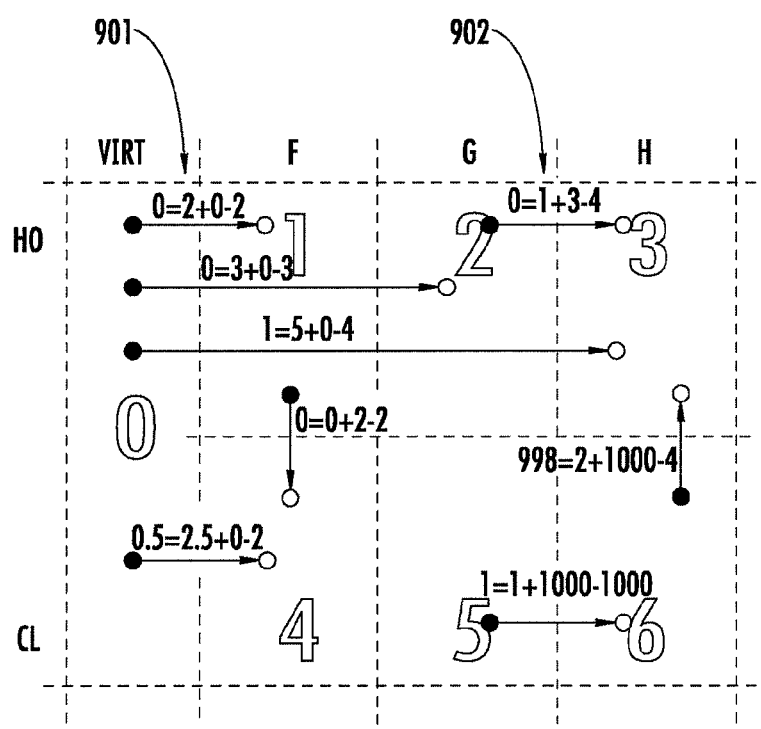
FIG. 10 shows the calculation of new edge weights that are guaranteed to be non-negative, a process referred to as reweighting.

The second step in calculating the implied markets is to reweight the edges. FIG. 10 shows the application of a reweighting rule where the new price of an edge is obtained by adding the original price to the weight of the source node and subtracting the weight of the target node. Order 1001 in FIG. 10 corresponds to order 601 from FIG. 6 with a new price computed using the weights of node 0 and node 1 from FIG. 9. Order 1002 in FIG. 10 corresponds to order 602 from FIG. 6 given the same treatment. The result of this procedure is to make all of the edge prices non-negative. Those of skill in the art will appreciate that converting from a machine price to a non-negative reweighted edge price for use in Dijkstra's algorithm is a straightforward procedure. Implementations herein are described in terms of reweighted prices with the understanding that other weightings, scalings and representations of the order price, time and volume are also possible.

Figure 11:
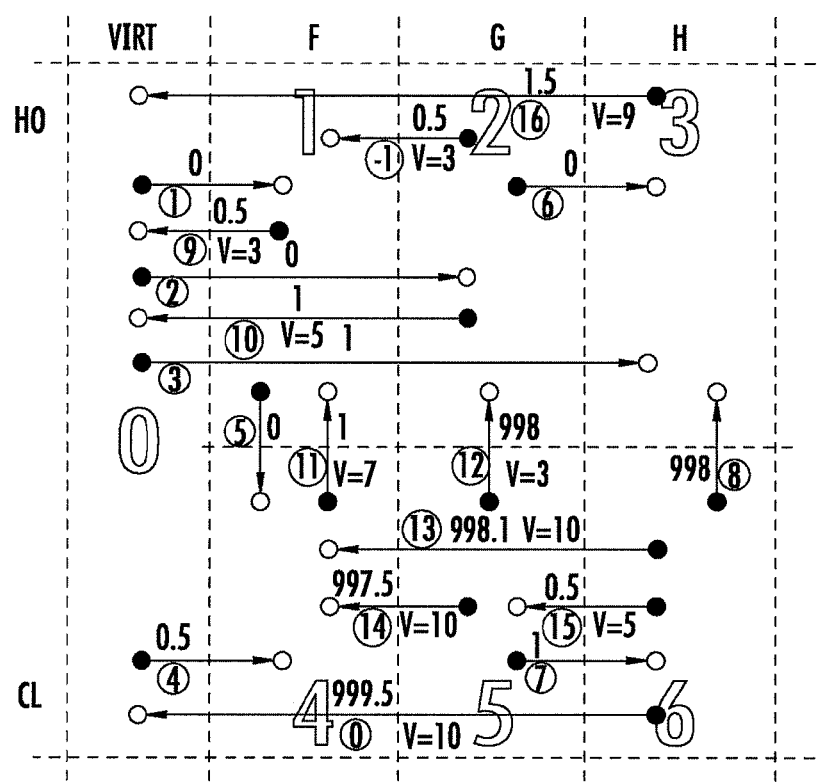
FIG. 11 shows the contract grid of FIG. 6. with the addition of more orders.
Figure 12:
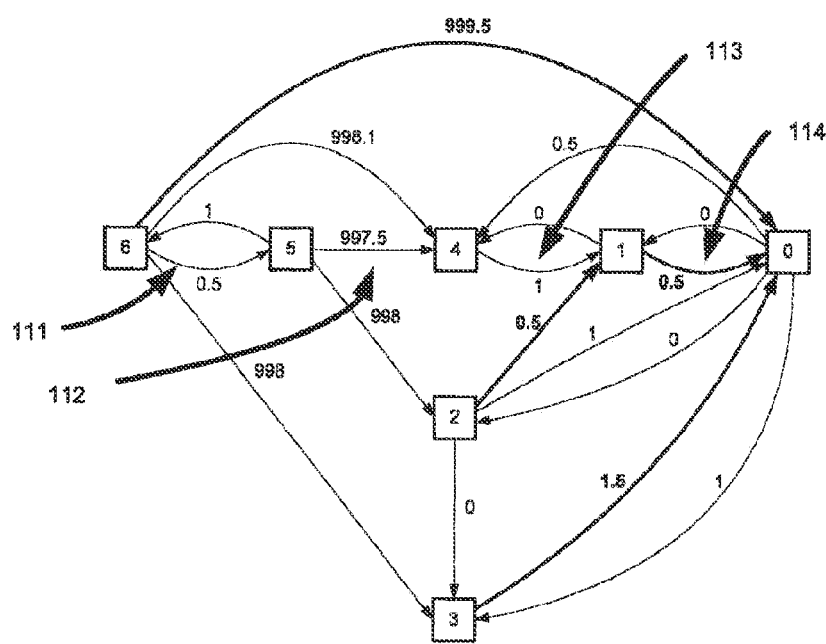
FIG. 12 shows an equivalent graph representation of the orders in FIG. 11.

FIG. 11 shows a more complicated example with the prices already reweighted. FIG. 12 shows the simplified node and edge graph representation. It is understood that although the relationship between orders and edges has been illustrated with individual orders, an edge can represent multiple orders at the same price level. In an implementation, there is only a single edge allowed in each direction between each pair of nodes. The price of this edge is the price of the best bid or ask in the contract side corresponding to the node pair. The volume of the edge is the total volume in the orders at the best price level. The time priority of the edge is the time priority of the earliest order in the best price level, also referred to as the front-of-queue order.

FIG. 13 to FIG. 19 show the shortest path trees for all seven root nodes. FIG. 20 collects the SPT vectors for each of these roots in a matrix shown as a two-dimensional array, spt[i,j]. A Match Engine specified in the Match Engine Modeling Language can be implemented using graph theory techniques to calculate the implied markets. The representation of implied markets as a collection of shortest path trees is based on this approach. It should be understood that the matrix is an abstraction used for illustration, that the array is a specific example and that the trees can be stored in a variety of different forms.

Figure 13:
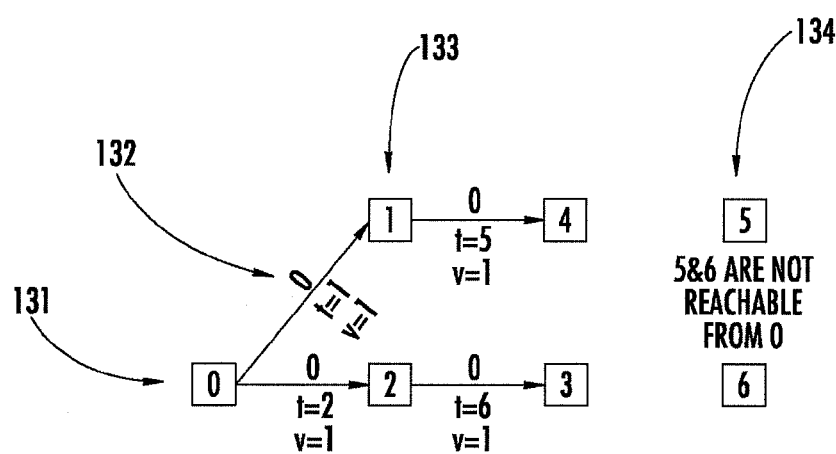
FIG. 13 shows the SPT rooted at node 0.

For example, row 0 of the spt[i,j] array (2001 in FIG. 21) represents the shortest path tree shown in FIG. 13. The value of 0 in column 0 of this row 2002 indicates that 0 is its own predecessor as the root of its tree. The value of 0 in column 1 (2003 in FIG. 21) indicates that node 0 is the predecessor of node 1 in the tree. The equivalent relationships can be seen in the graph of FIG. 13, where the root 131 has an edge 132 leading to node 1 (133). Node 5 is unreachable in FIG. 13 (134) and therefore has 5 as its predecessor in row 0 of the spt matrix (2005 in FIG. 21).

Figure 19:
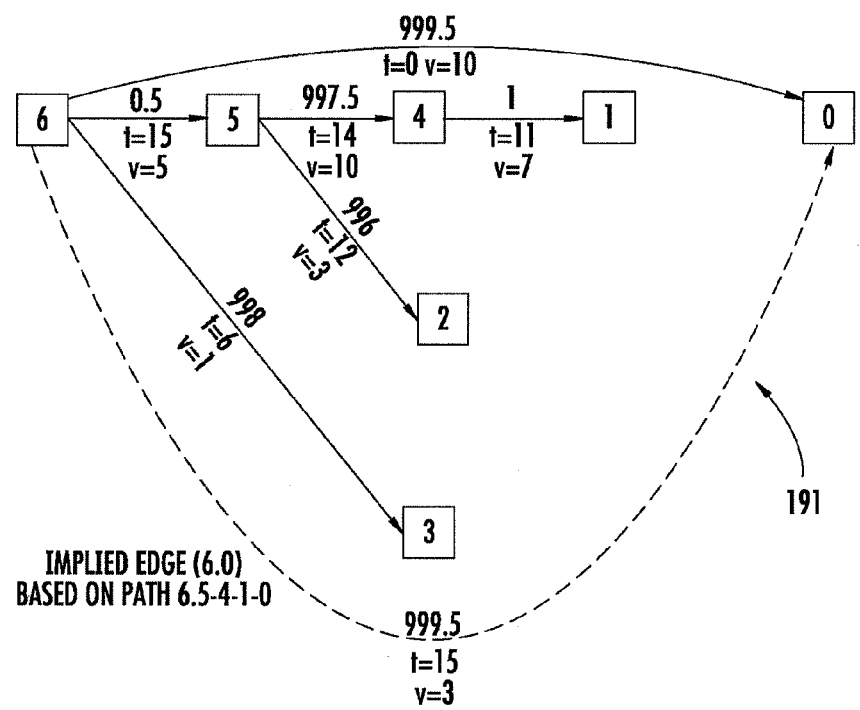
FIG. 19 shows the SPT rooted at node 6 in the same simplified form as the trees in FIG. 13 to FIG. 18.

In calculating the shortest path tree for a given root, the Implicator may determine that there is an implied (indirect) path with the same price but a different time priority than a real (direct) path. If it encounters an implied (indirect) path with a later time priority than the real path, it may record the implied path as an "implied edge" in an implied edge collection. In FIG. 12, such a path is formed by edges 121, 122, 123 and 124, which form the path 6-5-4-1-0. The shortest path tree in FIG. 19 shows this implied edge with a dashed line to indicate that it must be represented outside the array of predecessors stored in the spt[i,j] array. In an implementation, the container for these edges is referred to as the implied edge collection, which is associated with the shortest path tree that originates at the same root.

As previously stated, the non-negative reweighted edge prices reflect the differences between the best path on the buy side of the market and the best path on the sell side. In particular, the reweighted prices for all nodes reachable on the shortest path tree from virtual node 0 will themselves be zero. The prices for the paths between other root nodes and node 0 in their shortest path trees will represent the bid/ask spread in the corresponding market. This property extends to spread contracts but requires more computation since either side of a spread market can in theory be part of the shortest path tree rooted at node 0. This property of the shortest path trees is exploited in certain filtering operations described hereunder.

Figure 22:
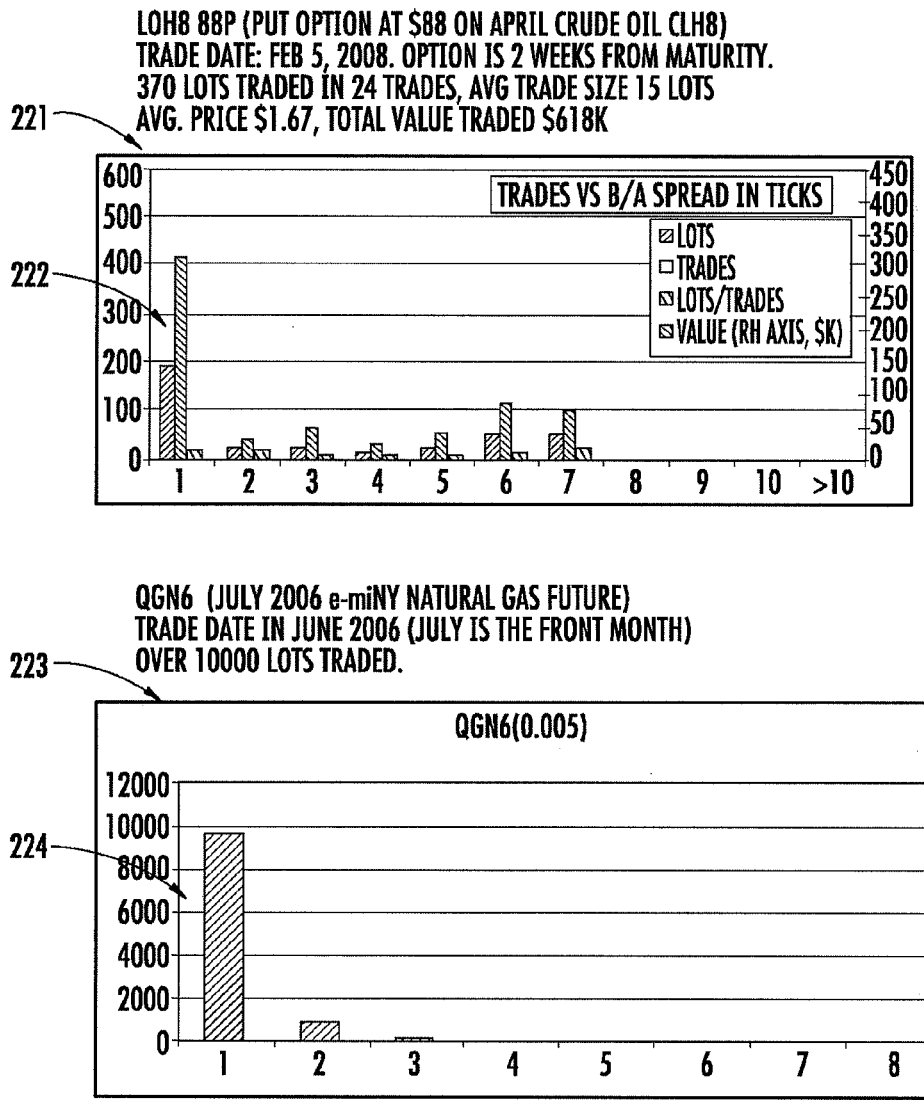
FIG. 22 shows traded volume versus prior bid/ask spread histograms for both a liquid market and an illiquid market.

As previously mentioned, the Match Engine categorizes the incoming order events as Implicator events depending on the changes they cause to a stored edge. FIG. 22 shows an exemplary list of such events and how they can occur. In an implementation, these events correspond to methods defined in the interface that connects the Implicator with the other parts of the Match Engine Core.

The Implicator analyzes the current implied orders to determine which trees, if any, will be changed by the changed edge and which nodes in these trees, if any, need to be recalculated. Each Implicator event has an analysis, including the default event for which the analysis simply designates all of the trees and all of their nodes for recalculation.

For every event there is a root set and a global change set. The root set contains the root nodes of the trees that are affected by the change. Each root in the root set has a root-specific change set that contains the nodes that are affected in the tree originating at that root. There is also a global change set that contains all of the nodes that are affected in all of the trees, which may be expressed mathematically as the union of the root-specific change sets. It is possible for the root set to be empty, in which case the change sets are automatically empty. If the root set is non-empty it is possible for any or all of the change sets to be empty. These sets are mathematical abstractions used to describe the algorithm and it is not necessary for the Implicator to construct them explicitly.

Figure 14:
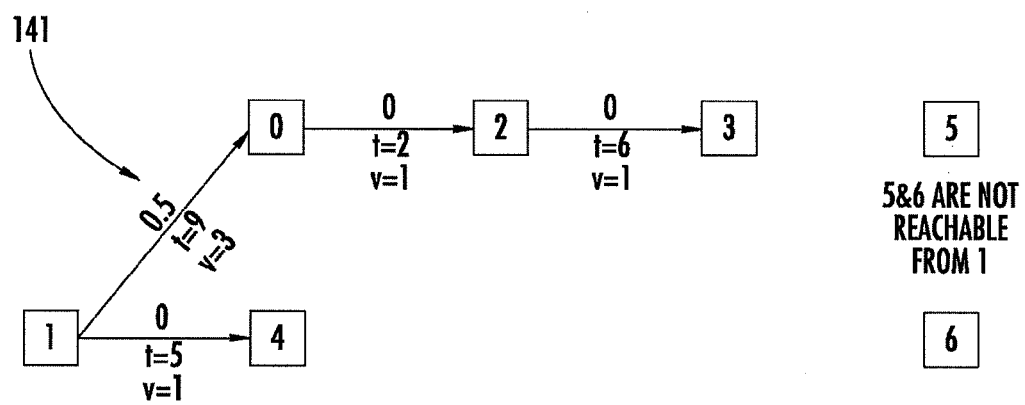
FIG. 14 shows the SPT rooted at node 1.
Figure 15:
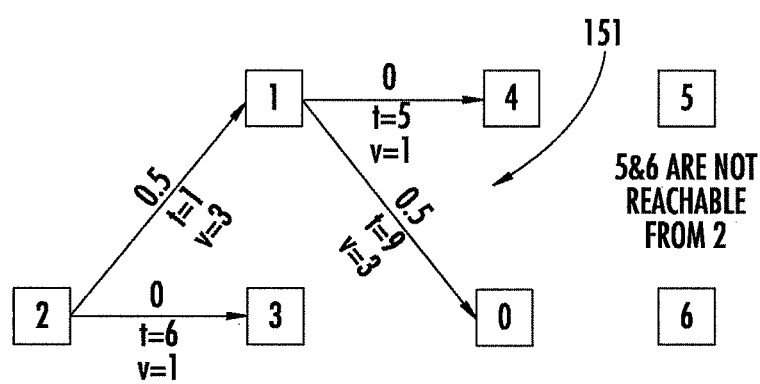
FIG. 15 shows the SPT rooted at node 2.

In an implementation, the spt[i,j] array can be used to identify the trees that contain a given edge. For example, the 1-0 edge is known to be present in the trees for roots 1, 2, 4 and 5, as can be seen in FIG. 14 (141), FIG. 15 (151), FIG. 17 (171) and FIG. 18 (181). In the spt[i,j] array, each tree is represented by a row. Each node is represented by a column. In column 0 (2002), 1 is the predecessor of 0 in rows 1, 2, 4 and 5. These are the trees that contain the 1-0 edge.

In an implementation, the spt[i,j] array can be used to identify trees which do not contain a given edge but which might contain that edge after the properties of that edge have changed. For example, in FIG. 20, the trees where node 1 has a predecessor other than itself are identifiable in column 1 as 0, 3 and 6. Additional criteria are then applied to determine which of these roots are relevant to the current Implicator event. Such criteria are calculated using node and edge properties that can be obtained from the data structure that represents the graph. Examples of such structures are the adjacency matrix and adjacency list, but the invention does not depend on any specific representation so long as the properties of nodes and edges can be retrieved for use by the Implicator in a timely manner.

Figure 16:
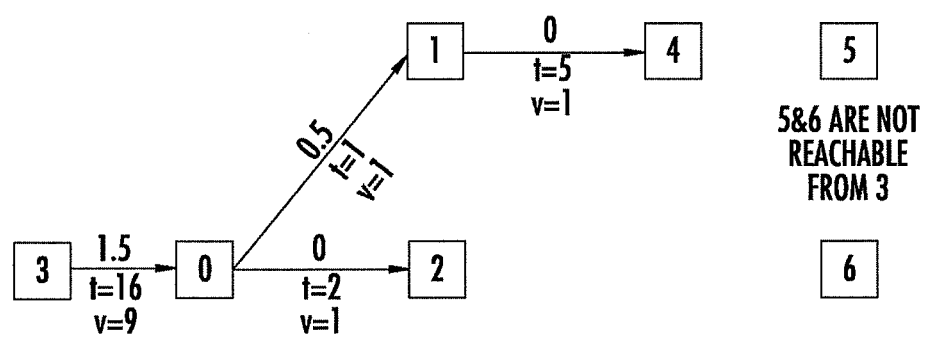
FIG. 16 shows the SPT rooted at node 3.
Figure 17:
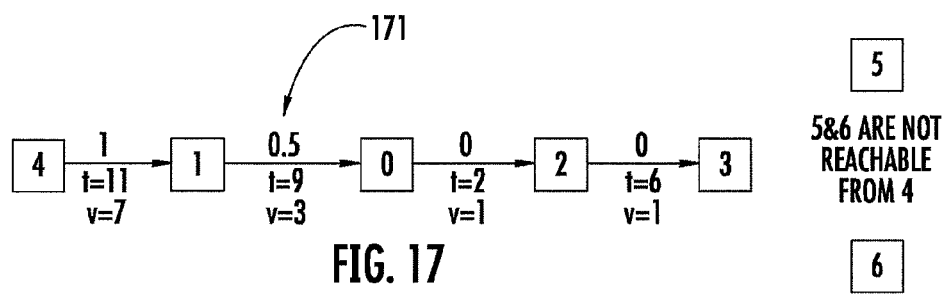
FIG. 17 shows the SPT rooted at node 4.
Figure 18:
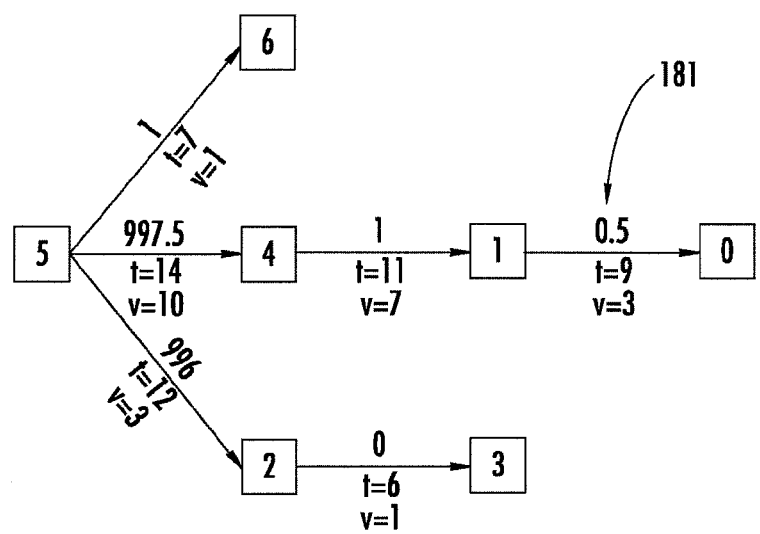
FIG. 18 shows the SPT rooted at node 5.

Application of additional criteria to determine which roots should have their trees recalculated in connection with the current Implicator event can be illustrated in a "Better Best" event, where, in our example, an improvement in the 1-0 edge could result in 1 becoming the predecessor of 0 in trees 0, 3 and 6. In this case, however, node 0 is excluded from the calculation, i.e. its tree should not be recalculated, because an improvement in the edge leading into node 0 cannot improve anything in the tree that originates with node 0. The root, by definition, has no predecessor. Continuing with this case, node 3 is excluded. This is illustrated in FIG. 16, where it is shown that, for the 1-0 edge to improve any path from 3 to 0, the path would have to go from 3 to 0 to 1 and back to 0 again—which contains a cycle which the graph is known not to contain. Expressed a different way, the path from 3 to 1 plus any improvement in 1-0 will be worse than the existing path from 3 to 0. Finally, in this case, the tree for node 6 is not excluded based upon these criteria. The tree rooted at node 6 will be recalculated, whereupon the 6-5-4-1-0 path will be found to result in a better price (see FIG. 12), the shortest path tree will be updated to contain this path (see FIG. 19) and the path then will be deleted from the root's implied edge collection.

As previously mentioned, the Implicator allocates independent subgroups of implied calculations to a number of independent threads of execution. In an implementation, the Implicator creates objects which extend the thread object provided by the programming language. A thread is created for each of the nodes in the contract grid so that each thread corresponds to a root. Each thread maintains its own shortest path tree, implied edge collection and other data associated with the tree's root. In an implementation, the shortest path tree may be represented by a collection of one-dimensional arrays containing predecessors, prices, times and volumes, as previously described. The objects have methods for setting their internal variables and a "run" method to begin their execution. The methods may read and write their local variables but are allowed only to read the variables they share with the parent thread. In this manner their execution can proceed in parallel.

In an implementation, the Implicator passes parameters to the threads that they can use to determine their root-specific change sets or otherwise reduce the extent of their calculations. For example, in a "Worse Best" event, it is known in advance that the implied orders can either be worsened or stay the same; no improvements are possible. Nodes where a direct path (i.e. a single real edge) is the best path cannot have this path replaced by a newly discovered indirect path (i.e. an implied). Such nodes can be excluded from the root-specific change set.

As previously mentioned, the Implicator sets filter criteria to limit the reporting of implied orders in the market data to those with the greatest business value, a technique referred to herein as revenue shaping, because the transmitted data can be prioritized according to the revenue it is likely to generate. This is a significant part of the invention, as the speed increase from parallel computation will not be fully exploited if the other parts of the Match Engine or the other components of the trading system cannot keep up. Although the invention has been described with the filtering being performed inside the Match Engine, it is also possible for the filtering to be performed at other points in the trading system.

For example, there are two simple criteria that can be applied either individually or in combination: bid/ask spread in ticks and number of events since the last trade. It is understood that a wide variety of filters are possible and that their specific details are determined by the business needs of the exchange. In an implementation, these filter criteria would be based on a filtering policy that could be represented as a set of expressions in an appropriate language, such as XML.

Continuing this example, FIG. 22 shows data that an exchange might use in creating a filtering policy. The two contracts shown have very different properties, but both show the same basic relationship between the bid/ask spread and the number of lots traded. The contract 221 shown in the upper graph is the front month at-the-money put option on crude oil trading electronically for a full day on the New York Mercantile Exchange. Only 370 lots were traded. The second contract 223 is the front month emiNY™ natural gas futures contract, traded electronically for a full day on the New York Mercantile Exchange. Over 10,000 lots were traded. In both cases, the majority of trades take place when the bid/ask spread prior to the trade was one tick (222, 224). The effect is stronger in the more heavily traded contract, the futures contact 223, but is still present in the option contract 221 even when the number of trades is relatively small. Relationships that apply to multiple contracts might be used to define the general rules in the filtering policy.

For the contracts shown, trading data shows that implied orders for which the bid/ask spread is smaller are more likely to be traded. However, implied orders in the market data are more likely to encourage trades where they visibly narrow the spread or provide additional volume. The threshold criteria might therefore be defined to apply separately to the calculation of implied orders and their publication in the market data. An exchange Implied orders might be calculated for all markets with a bid/ask spread below the trading threshold, but only reported for markets where the bid/ask spread is large enough to be affected by an implied or where the exchange wishes to show the presence of orders (i.e. liquidity). The appropriate thresholds could be different for each contract and might be represented with contract-specific rules in the filtering policy.

Further continuing the example, FIG. 22 can also be used to estimate the frequency of trades in the crude oil option contract 221. Even if the twenty-four trades in this contract took place during brief periods when the underlying CLH8 contract was changing in price, these periods were several minutes in duration and the rate of messages associated with this contract was therefore relatively low. If a contract trades infrequently, then a long delay between two trades is likely to be followed by another long delay before the next trade, which in this context long means several seconds or more. Even though many of the trades take place at bid/ask spreads of 6 or 7 ticks, the improvement of the spread from 7 to 6 may only result in one trade for every thousand occurrences. In such a case, a time or rate criterion might form part of a rule in the filtering policy.

In an implementation, the Match Engine reads a file containing the filtering policy either as part of its initialization or when commanded to do so by the operator of the trading system. The filtering policy is translated into time, rate and threshold criteria that can be passed to the Implicator, from which an appropriate subset can be passed to each thread of execution in an appropriate form. The criteria passed to each thread may depend on the preceding orders and trades and may therefore be updated by the Implicator or other parts of the Match Engine from time to time.

In an implementation, the Implicator provides the thread with a bid/ask spread threshold, which may be common to all the contracts or specialized for each, as suggested above. In the simplest form, if the node prices calculated using Dijkstra's algorithm on reweighted edges indicate that the difference between the best bid and the best ask would be greater than this threshold, the market data is not passed back to the Implicator for publishing. It is understood that the implied order itself remains in the Match Engine and will be traded if an incoming order matches its price, so that traders always receive the best possible fill for their orders. It is also understood that the published market data must indicate the deletion of implied orders that no longer exist.

In an implementation, the Implicator also provides the thread with message count threshold, which may be common to all the contracts or specialized for each. If the difference between the best bid and best ask is greater than the bid/ask spread threshold, the market data is not published until the number of messages since the message that completed the implied has exceeded the message count threshold.

Those of skill in the art will appreciate that Dijkstra's algorithm adds nodes to the shortest path tree in order of their weight. As a result, the bid/ask spread criterion not only reduces the amount of market data to report, but also allows the algorithm to be terminated early, thereby reducing the computation time even further. The lowest weighted nodes have the greatest probability of trading and therefore have the greatest revenue potential.

In an implementation, the Adaptation Layer may measure the rate at which messages are arriving and compare this with a table of input rate thresholds and output market data volume targets, the latter being specific to the trading system and determined by the capacity of its hardware and software components. When the Adaptation Layer detects that a threshold has been crossed and the message rate is likely to remain within the range established by the neighboring thresholds, it communicates the corresponding market data volume target to the Match Engine Core. A second table, with its entries based on measured trader behavior, associates the target market data rate with a bid/ask spread criterion for each contract. This second table is made available to the Match Engine Core and may be used by the Implicator to vary the bid/ask spread criterion in response to conditions in the external trading system, a technique referred to as adaptive implication.

As previously mentioned, the Implicator sets criteria for managing the execution of the independent threads on separate CPUs. In an implementation, these criteria are passed to runtime library code provided as a part of the programming language and its associated tools which in turn pass criteria to the parts of the computer's operating system that actually manage the threads of execution. For example, commonly-available versions of Java and C++ provide this type of library code.

Finally, the Implicator merges the filtered market data into a single message appropriate for translation by the Adaptation Layer for publication as market data to other components of the trading system. In an implementation, each thread creates a list of implied market data additions, volume updates and deletions for the contracts associated with the nodes in the thread's shortest path tree. When the thread signals the completion of its calculations to the Implicator, the Implicator adds the list to its collection of change lists for the current event. When the last thread has reported or some other criteria have been met, the Implicator passes the collection to a market data thread for translation into the form of message expected by the external trading system. This market data thread can be associated with the Adaptation Layer 202 shown in FIG. 2.

Figure 23A:
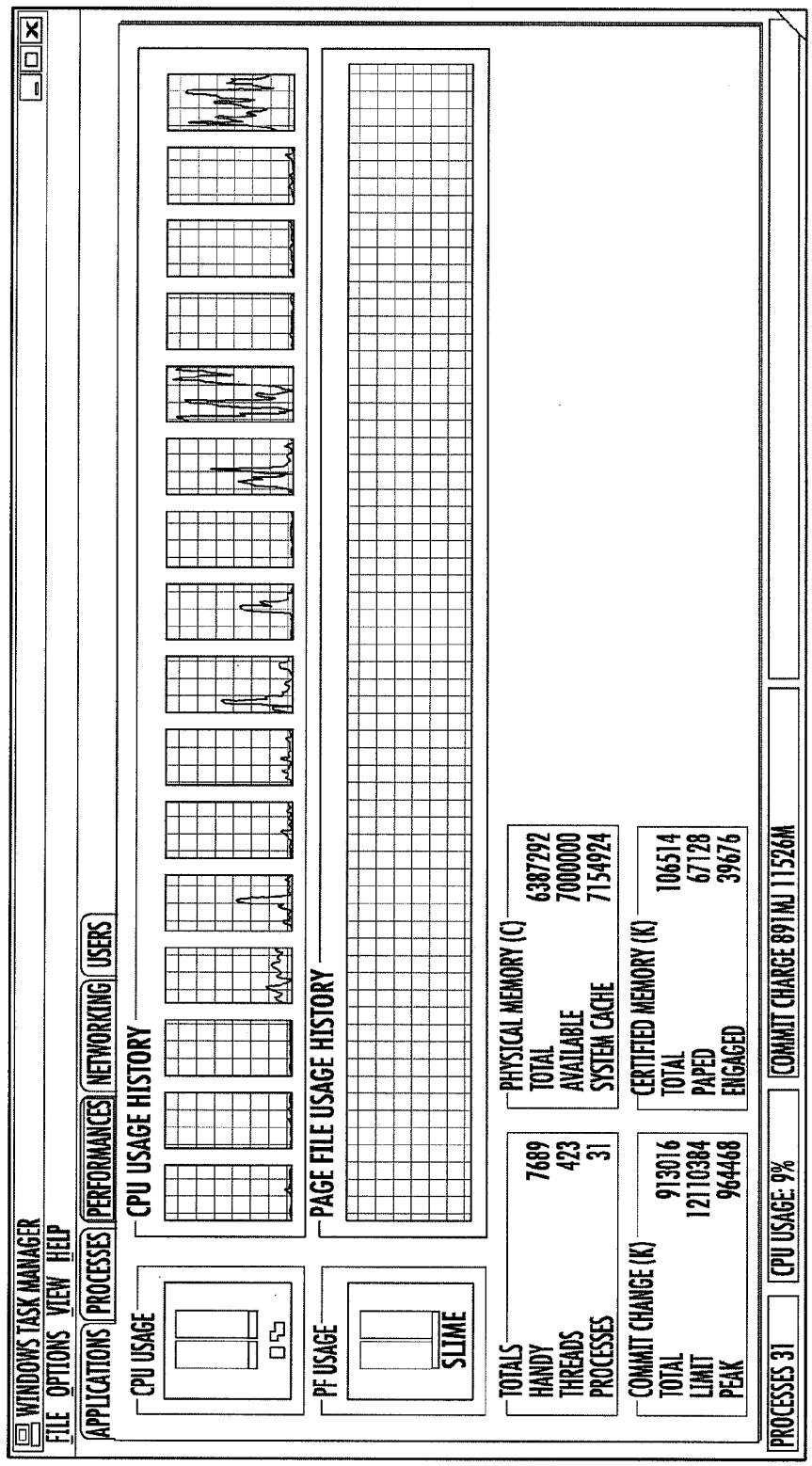
FIG. 23a shows the performance of an exemplary Match Engine that uses a single-thread mode.
Figure 23B:
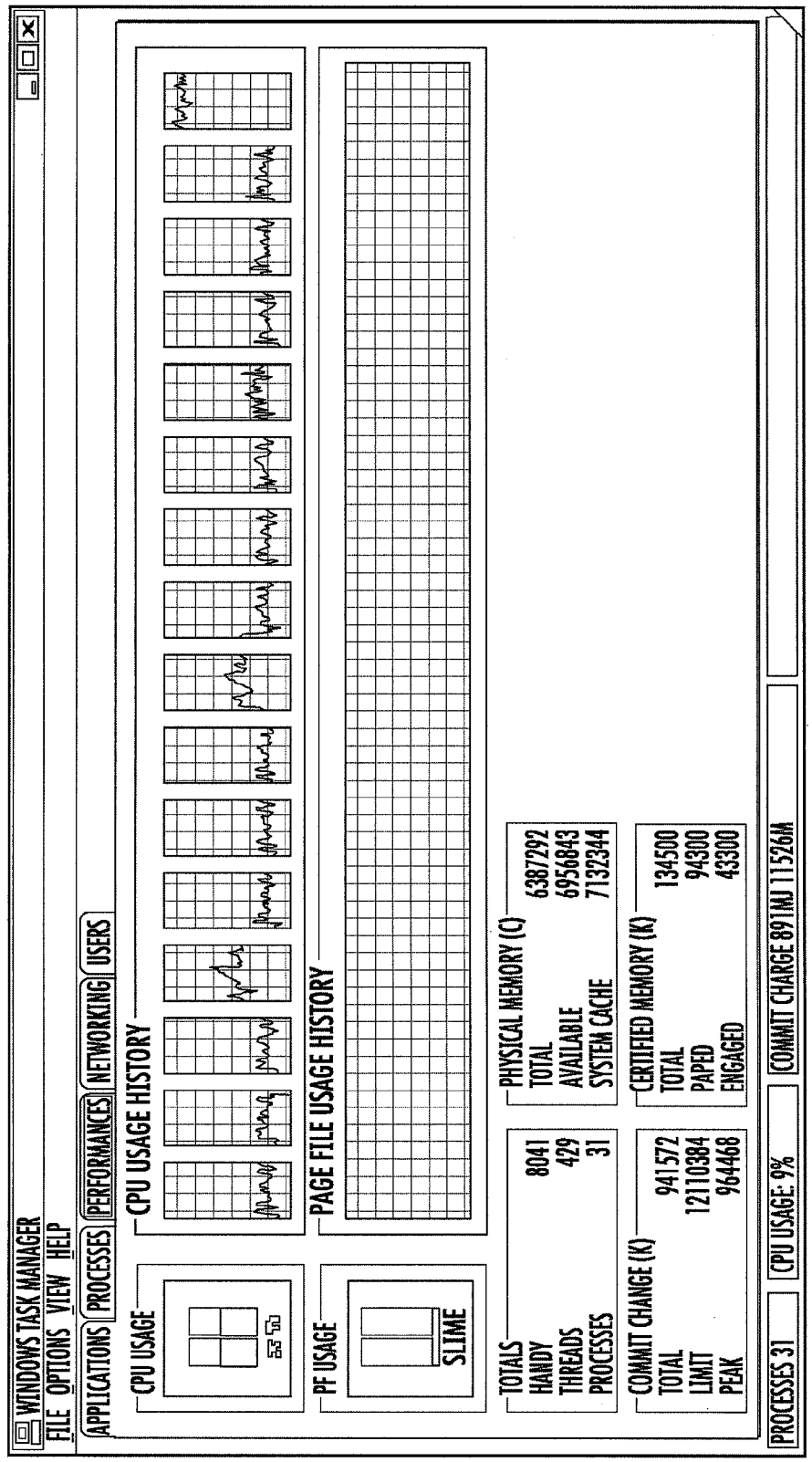
FIG. 23b shows the performance of an exemplary Match Engine that uses a multi-thread mode.

FIG. 23 illustrates the performance of a Match Engine implemented in Java and running on a host with 16 processors. The top image shows the Windows Task Manager for execution in single-threaded mode where all the shortest path trees are calculated with a single thread. The bottom image shows the execution in multithreaded mode. There are 56 more threads active in the multithreaded version (479 versus 423). This corresponds to the 49 trees that can be calculated in parallel and 7 additional threads added by the Java Virtual Machine or other system components over which the Implicator has no direct control. The 49 trees result from 4 products with full implication in the first 12 delivery months plus a virtual node.

In the lower image in FIG. 23, the most active processor at the far right is handling market data publication. The market data is being filtered with a very simple frequency filter referred to a "movie mode", where the market data updates are published at a fixed rate for all contracts, the rate being determined by the response time of the human visual system. In an implementation, the filtering could be further refined to obtain the greatest amount of revenue producing market data from the available hardware.

Figure 24:
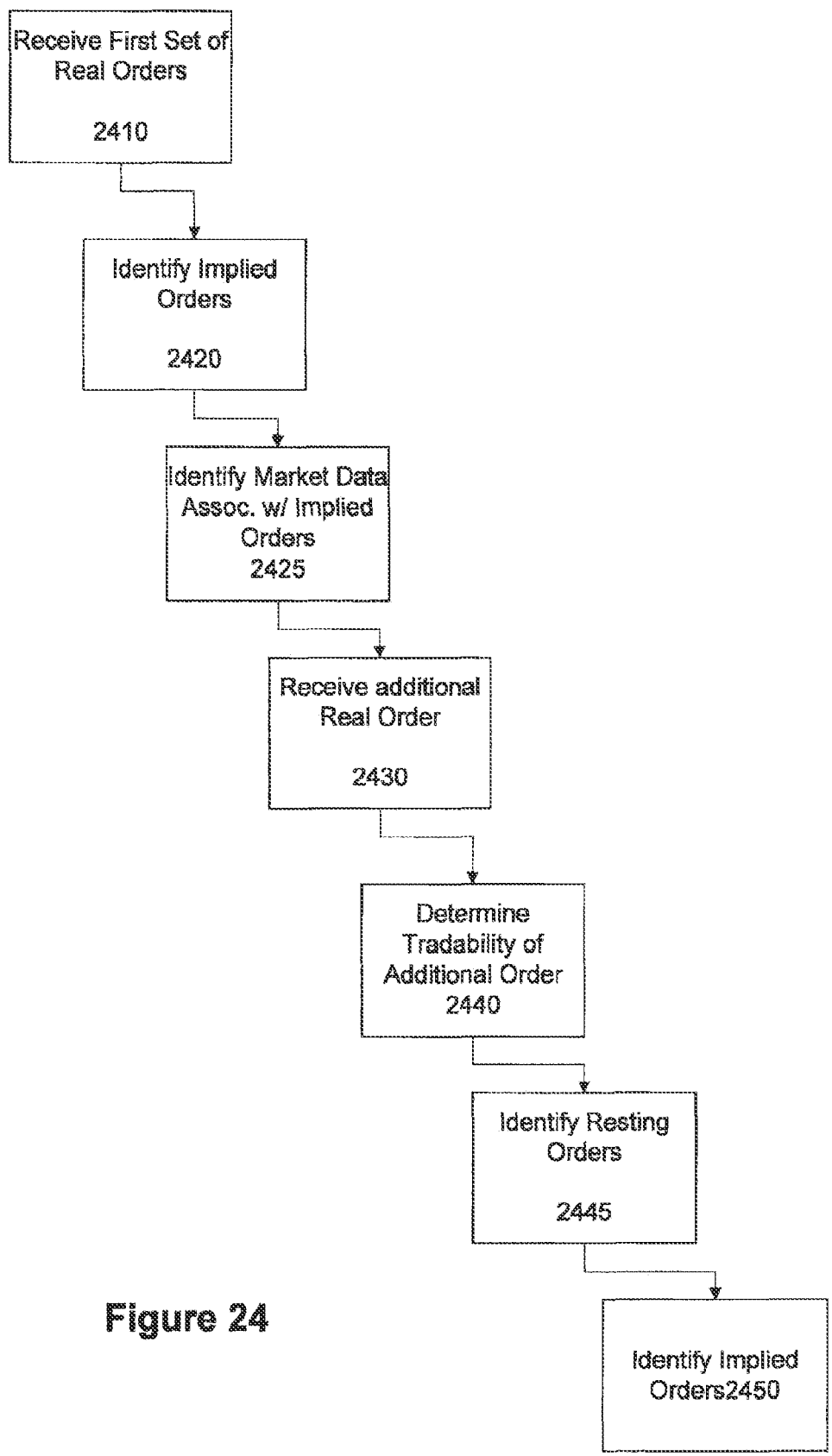
FIG. 24 is a flow chart of an exemplary method of determining implied orders.

In an exemplary implementation, a computer implemented method of determining implied orders is provided. With reference to FIG. 24, the exemplary method 2400 comprises the steps of: receiving a first set of one or more real orders 2410, identifying one or more implied orders within the first set of real orders 2420; identifying market data corresponding to the implied orders 2425; receiving at least one additional real order 2530; determining the tradability of the at least one additional real order 2440; identifying a set of resting orders within the first set of real orders 2445; and identifying one or more implied orders within the resting set of orders 2450

The step of receiving one or more real orders 2410 can include receiving real market orders over a network. The one or more orders can be received in real time or in batches according to a predetermined schedule. In an implementation, one or more real orders can be sent from a client through an order submission point, validated against predetermined criteria, and received at a match engine. The real order can include best bid data and best ask data.

The step of identifying one or more implied orders within the first set of real orders 2420 can include identifying implied order using an Implicator. Implied orders can be determined using a visual Match Engine Modeling Language and graph theory, as described above. Identifying one or more implied orders can include calculation of one or more shortest-path-trees including one or more nodes.

Market data associated with the implied orders and/or real orders can also be identified, as in step 2425. Market data can include an instrument or contract identifier, a side, which may be buy or sell, a price, a quantity available for trading at that price, such as the number of contracts, the origin of the quantity, which may be real or implied and the action by the trading system that caused the market data to be identified or published, such as the addition of a new price level, deletion of a price level, change of the available quantity at a price level or change in the state of a market. In some market states the market data may contain summary or indicative data to assist the client in interpreting the basic prices and quantities. Market data that will be transmitted in the form of a message may also include data to identify its provenance and facilitate its delivery, such as the time and location of its calculation or identification, the names of those entitled to receive it, and so on.

An additional real order can be received, 2430. The additional real order can sent from a client through an order submission point, validated against predetermined criteria, and received at a match engine. In an implementation, using a match engine, the additional real order can be compared against the real or implied orders to determine if a tradable match exists. Upon determination that an additional real order is tradable against a real or implied order, the match engine can execute a trade as described above. If the additional real order is not tradable against the real or implied orders in the first set, the additional real order can be added to the first set of real orders. The additional real order can be stored for later processing. The additional order can be added to a set of resting orders.

Upon receipt of an addition real order, such additional real order can be categorized according to its affect on a directed edge or its affect on a shortest-path-tree. The additional real order can be categorized by one or more categories including, better best price, worse best price, greater volume in best level, and less volume in best level. Other categories can be used. Upon determining that a tree is affected by the additional real order, new values for trees or nodes of trees can be calculated.

A set of resting orders can be determined by identifying those real and or implied orders that remain from the first set of real orders after the additional real order has been found to be tradable against a real or implied order. Having identified the resting set of orders 2445, additional implied orders can then be calculated 2450, in a manner similar that described above.

Implied orders and tradable matches between the additional real order and other real orders or implied orders can be sent in the form of a message over an electronic trading system as described above.

Other implementations are possible. For example, in an implementation, a computer implemented method for calculating and trading implied orders is provided. A first set of one or more real orders can be received at a match engine. The one or more real orders can be within a first set of real orders wherein individual real orders are not tradable against each other because: prices do not match between real orders; volumes are insufficient or do not match; or one or more real orders required to complete a trade is not present within the first set of real orders. The first set of real orders can further belong to a resting set of real orders within the match engine or stored elsewhere in the electronic trading system. The resting set of orders can comprise all or part of the first set of real orders wherein the real orders are unmatched for trading, and/or have not been traded in an executed trade.

One or more implied orders can be calculated from the real orders in the first set of real orders. Related groups of real or implied orders can be linked or associated together, wherein the prices of related orders may be added or otherwise combined to calculate the price of an implied order. Appropriate scaling and reweighting can be used in order to form groups of related orders. Volumes of implied orders can be determined from the volumes available at the price level or levels of each order in the linked chain of orders. As such, prices and volumes of implied orders are determined, and groups of related implied orders can be formed. Groups of related implied orders can be assigned to parallel threads of execution and managed according to optimize performance and efficiency of the match engine and the electronic trading system as a whole.

Market data corresponding to real and implied orders can be identified as implied orders are calculated and associated into related groups. The market data can include criteria for publishing either the implied order and/or the corresponding market data.

An additional real order can be received by the match engine. The additional real order can be analyzed to determine the tradability of the real order against the first set of real orders, the resting set of orders, or one or more groups of related implied orders. The additional real order can be tradable against one or more real orders in the resting set or first set of real orders based on the principle that an implied order represents a set of real orders whose prices and volumes allow the real orders to be traded with a yet to be received real order on the opposite side of the market.

If the additional real order is tradable against one or more real orders within the resting set or first set of real orders, a trade can be executed.

The resting set and/or the first set of real orders can be updated to reflect the executed trade. Additionally, if a trade is not executed, the resting set or the first set of real orders can be updated to reflect yet another real order received at the match engine or any other newly received order. One or more implied orders can be identified within the updated resting set.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

The invention claimed is:
1. A computer implemented method comprising:
   receiving a plurality of real orders, wherein the real orders are not tradable against each other;
   identifying, by a processor, a plurality of implied orders from the real orders;

determining, by the processor, bid/ask spreads for the implied orders;

filtering, by the processor, the implied orders to generate a first subset of the implied orders each having a bid/ask spread that is less than a threshold; and publishing market data on the first subset of the implied orders and not the remaining implied orders.

2. The method of claim 1, further comprising:

determining a second subset of the implied orders each having a bid/ask spread that exceeds the threshold, wherein the second subset differs from the first subset; and publishing market data on the second subset in response to determining that a number of messages exceeds a message count threshold.

3. The method of claim 1, wherein identifying of the implied orders comprises calculation of one or more shortest path trees using a shortest path algorithm.

4. The method of claim 3, further comprising terminating the shortest path algorithm based on the threshold.

5. The method of claim 3, further comprising determining a shortest path by the shortest path algorithm as a function of price path, price volume, and path time.

6. The method of claim 5, wherein the price path is a sum of prices in the shortest path.

7. The method of claim 5, wherein the price volume is based on a minimum volume of any component edge within the shortest path.

8. The method of claim 5, wherein the path time is based on a time priority number of any component edge within the shortest path.

9. The method of claim 1, wherein the threshold is common to a plurality of contracts.

10. The method of claim 1, wherein the threshold is different for each of a plurality of contracts.

11. The method of claim 1, wherein the threshold is based on a number of ticks between a best bid and a best ask.

12. A non-transitory computer readable medium storing instructions that, when executed, causes a computer at least to perform:

receiving a plurality of real orders, wherein the real orders are not tradable against each other;

identifying a plurality of implied orders from the real orders;

determining bid/ask spreads for the implied orders;

filtering the implied orders to generate a first subset of the implied orders each having a bid/ask spread that is less than a threshold; and publishing market data on the first subset of the implied orders and not the remaining implied orders.

13. The computer readable medium of claim 12, further comprising:

determining a second subset of the implied orders each having a bid/ask spread that exceeds the threshold, wherein the second subset differs from the first subset; and publishing market data on the second subset in response to determining that a number of messages exceeds a message count threshold.

14. The computer readable medium of claim 12, wherein identifying of the implied orders comprises calculation of one or more shortest path trees using a shortest path algorithm.

15. The computer readable medium of claim 14, further comprising terminating the shortest path algorithm based on the threshold.

16. The computer readable medium of claim 14, further comprising determining a shortest path by the shortest path algorithm as a function of price path, price volume, and path time.

17. An apparatus comprising:

a processor;

a memory storing instructions that, when executed by the processor, cause the apparatus at least to perform:

receiving a plurality of real orders, wherein the real orders are not tradable against each other;

identifying a plurality of implied orders from the real orders;

determining bid/ask spreads for the implied orders;

filtering the implied orders to generate a first subset of the implied orders each having a bid/ask spread that is less than a threshold; and publishing market data on the first subset of the implied orders and not the remaining implied orders.

18. The apparatus of claim 17, further comprising:

determining a second subset of the implied orders each having a bid/ask spread that exceeds the threshold, wherein the second subset differs from the first subset; and publishing market data on the second subset in response to determining that a number of messages exceeds a message count threshold.

19. The apparatus of claim 17, wherein identifying of the implied orders comprises calculation of one or more shortest path trees using a shortest path algorithm.

20. The apparatus of claim 19, further comprising determining a shortest path by the shortest path algorithm as a function of price path, price volume, and path time.

* * * * *